United States Patent [19]

Dawson

[11] Patent Number: 5,727,155
[45] Date of Patent: Mar. 10, 1998

[54] METHOD AND APPARATUS FOR DYNAMICALLY CONTROLLING A REMOTE SYSTEM'S ACCESS TO SHARED APPLICATIONS ON A HOST SYSTEM

[75] Inventor: Bryan J. Dawson, Aloha, Oreg.

[73] Assignee: Intel Corporation, Santa Clara, Calif.

[21] Appl. No.: 790,384

[22] Filed: Jan. 29, 1997

Related U.S. Application Data

[63] Continuation of Ser. No. 604,091, Feb. 20, 1996, abandoned, which is a continuation-in-part of Ser. No. 303,416, Sep. 9, 1994, abandoned.

[51] Int. Cl.$^6$ ............................................. G06F 15/00
[52] U.S. Cl. ............................ 395/200.35; 395/200.47
[58] Field of Search ........................ 395/200.01, 200.02, 395/200.04, 200.09, 186, 609, 610, 200.34, 200.35, 200.47, 650, 700, 728; 380/4

[56] References Cited

U.S. PATENT DOCUMENTS

| | | | |
|---|---|---|---|
| 4,685,124 | 8/1987 | Smitt et al. | 379/93.04 |
| 4,891,749 | 1/1990 | Hoffman et al. | 395/479 |
| 4,949,248 | 8/1990 | Caro | 395/200.33 |
| 5,161,227 | 11/1992 | Dias et al. | 395/650 |
| 5,206,934 | 4/1993 | Naef, III | 395/200.34 |
| 5,263,165 | 11/1993 | Janis | 395/490 |
| 5,276,735 | 1/1994 | Boebert et al. | 380/21 |
| 5,311,591 | 5/1994 | Fischer | 380/4 |
| 5,388,211 | 2/1995 | Hornbuckle | 395/712 |
| 5,392,400 | 2/1995 | Berkowitz | 395/200.33 |
| 5,423,034 | 6/1995 | Cohen-Levy et al. | 395/610 |
| 5,423,044 | 6/1995 | Sutton et al. | 395/726 |
| 5,488,686 | 1/1996 | Murphy et al. | 395/330 |
| 5,583,993 | 12/1996 | Foster et al. | 395/200.35 |
| 5,596,721 | 1/1997 | Masse et al. | 395/200.35 |

*Primary Examiner*—Parshotam S. Lall
*Assistant Examiner*—Viet Vu
*Attorney, Agent, or Firm*—Blakely, Sokoloff, Taylor & Zafman

[57] ABSTRACT

A method and apparatus which dynamically controls a remote system's access to a selected application(s) of a host computer system coupled to the remote system. The host system transfers an access level to the remote system, which indicates whether modifications to the selected application(s) can be made by the remote system. The host system also transfers information indicating the current display of the selected application(s) to the remote system. The remote system may then transfer information to the host system, depending on this access level. The remote system's ability to transfer information to the host system can be altered by the host system while the remote system is coupled to the host system. In one embodiment, the remote system can be given either unlocked or locked access. Unlocked access allows the remote system to transfer information to the host system which modifies the selected application(s) on the host system. Locked access prevents the remote system from modifying the selected application(s), however the remote system still receives information from the host system indicating the current display of the selected application(s) on the host system.

20 Claims, 11 Drawing Sheets

METHOD AND APPARATUS FOR DYNAMICALLY CONTROLLING A REMOTE SYSTEM'S ACCESS TO SHARED APPLICATIONS ON A HOST SYSTEM

This is a continuation of application Ser. No. 08/604,091, filed Feb. 2, 1996, now abandoned, which is a continuation of application Ser. No. 08/303,416, filed Sep. 09, 1994, abandoned.

BACKGROUND OF THE INVENTION

FIELD OF THE INVENTION

The present invention pertains to the field of computer systems. More particularly, this invention relates to controlling access to shared applications on a computer system.

BACKGROUND

Computer technology is continuously advancing, resulting in modern computer systems which provide ever-increasing performance. One result of this improved performance is an increased use of computer systems by individuals in a wide variety of business, academic and personal applications. One such use is that of remote access, where one or more computer systems are coupled together using, for example, modems and a telephone line. One particular type of remote access is referred to as personal conferencing, where users of multiple computer systems in different locations communicate with each other. These different locations can span large distances, such as between two offices in the same city or between two offices in different countries.

The benefits of personal conferencing are numerous. Among these benefits is the ability of multiple individuals to communicate information and ideas to one another over large distances. The information and ideas can be displayed by each computer system, and frequently verbal discussions can accompany the images. For example, an individual in one city may employ the services of an accountant in another city. Rather than requiring one or the other to travel to the other's city, the two individuals may establish a personal conferencing environment in which they transfer images between each other. These images may be, for example, completed tax forms, spreadsheet data, etc.

Prior to remote access applications like personal conferencing, one method of providing a remote user with the ability to access a host computer system gives the remote user complete control of the host system. That is, the remote user connects to the host system and operates the host system as if the remote user were physically in front of the host system. Thus, all applications operating on the host system, as well as data stored in the system and any applications which can be executed by the system, are within the control of the remote user. This can be detrimental for several reasons. First, it may be undesirable for the user to relinquish complete control of the system because it could result in the remote user obtaining access to information the user does not want the remote user to have access to. Such access could result in damage being done to the system or data within the system before the user is able to stop the remote user by severing the connection. Second, such complete control typically does not allow for user interaction. That is, when the remote user takes over the system all control is given to the remote user; the owner of the system typically does not have the ability to easily or conveniently alter applications or make changes which the remote user can observe.

Another type of remote access system in the prior art allows the owner of the system to share access with the remote user. In this type of system, only one of the owner or the remote user will have access to the system at any one particular time, not both. One disadvantage to such a system is that in order for access to be changed to a different user, the user without access must request it from the user with access. The user with access must then decide whether to relinquish access to the requesting user. Such a request is made every time a user without access desires access. Thus, in situations where significant interaction is occurring between two users, this type of system requires a substantial amount of ongoing user involvement, which is frequently distracting and annoying to both users. Furthermore, once the owner of the system relinquishes control to a remote user, there is nothing requiring the remote user to give control back to the owner when requested.

Since neither methods are suitable for remote access applications like personal conferencing, it would be advantageous to provide a system which allows a user to give access to the system to a remote user without relinquishing complete control of the system.

Furthermore, it would be advantageous to provide a system which allows multiple users to easily and conveniently share access to a particular application without a substantial amount of ongoing user involvement.

The present invention provides for these and other advantageous results.

SUMMARY OF THE INVENTION

A method and apparatus for dynamically controlling a remote system's access to shared applications on a host system is disclosed herein. A host system can be coupled to a remote system, thereby allowing the remote system access to a selected application(s) on the host system. The host system transfers an access level to the remote system, which indicates whether modifications to the selected application(s) can be made by the remote system. The host system also transfers information indicating the current display of the selected application(s) on the host system to the remote system. The remote system may then be able to transfer information to the host system, depending on this access level. The remote system's ability to transfer information to the host system can be altered by the host system while the remote system is coupled to the host system.

In one embodiment, the remote system can be given unlocked access or locked access. Unlocked access allows the remote system to transfer information to the host system which modifies the selected application(s) on the host system. Locked access prevents the remote system from modifying the selected application(s), however the remote system still receives information from the host system indicating the current display of the selected application(s) on the host system.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the descriptions to follow, the present invention is described as being implemented in a Windows™-based operating environment. It will be appreciated, however, that other operating systems and environments may be used within the spirit and scope of the present invention.

Figure 1:
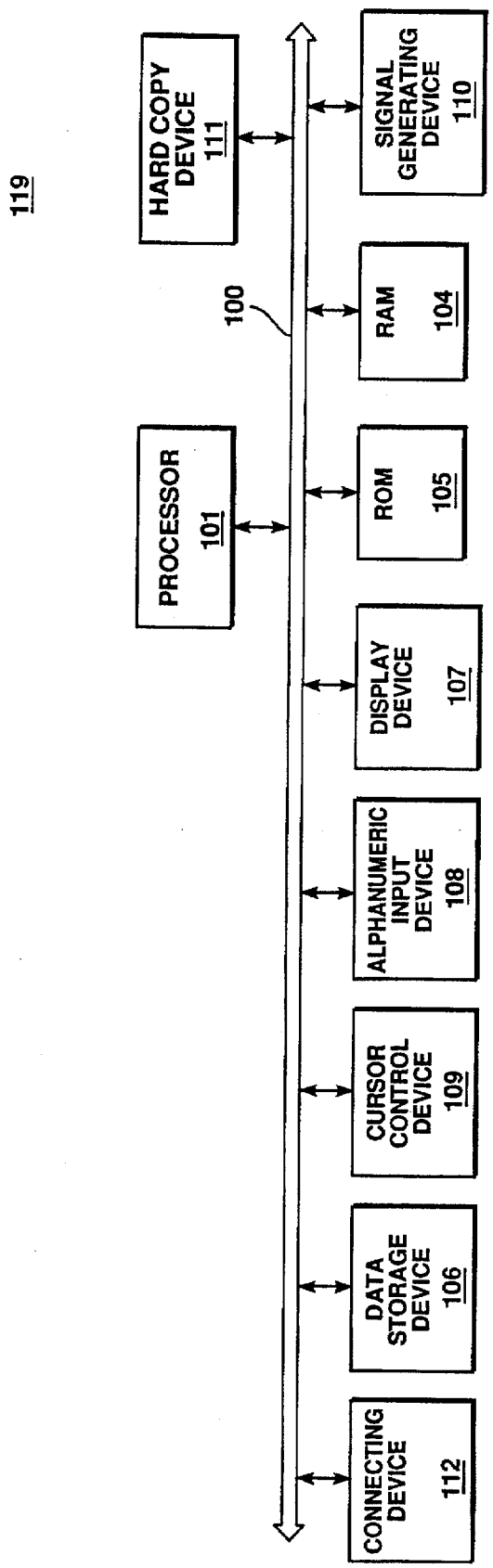
FIG. 1 shows a block diagram of an exemplary computer system of the present invention.

An exemplary computer system of the present invention is illustrated in block diagram format in FIG. 1. A system 119 is shown, generally comprising a bus or other communication device 100 for communicating information and a processor (CPU) 101 coupled with bus 100 for processing information and instructions. In one embodiment, the processor of the present invention is an Intel® Architecture Microprocessor such as manufactured by Intel® Corporation of Santa Clara, Calif., the corporate assignee of the present invention. In one embodiment, bus 100 includes address, data and control buses.

The computer system 119 also includes a random access memory (RAM) 104 coupled with bus 100 for storing information and instructions for processor 101, a read only memory (ROM) 105 coupled with bus 100 for storing static information and instructions for processor 101, a data storage device 106 such as a magnetic disk and disk drive coupled with bus 100 for storing information and instructions, a display device 107 coupled with bus 100 for displaying information to the computer user, an alphanumeric input device 108 including alphanumeric and function keys coupled with bus 100 for communicating information and command selections to processor 101, a cursor control device 109 coupled with bus 100 for communicating user input information and command selections to processor 101, and a signal generating device 110 coupled with bus 100 for communicating command selections to processor 101.

A hard copy device 111 such as a plotter or printer, is also coupled with bus 100 for providing a visual representation of the computer images. In one embodiment, a connecting device 112 is coupled with bus 100 for allowing the system to communicate with other computer systems over a larger network of computer systems, such as a local area network (LAN). Alternatively, connecting device 112 may include a conventional modem for connecting the computer system 119 to another computer(s) over a telephone line or other similar communication device.

Display device 107 utilized with the computer system of the present invention may be a liquid crystal device, cathode ray tube, or other display device suitable for creating graphic images and alphanumeric characters (and ideographic character sets) recognizable to the user. Cursor control device 109 allows the computer user to dynamically signal the two dimensional movement of a visible symbol (e.g., a pointer or a cursor) on a display screen of the display device 107. Many implementations of the cursor control device are known in the art including a trackball, mouse, joystick or special keys on alphanumeric input device 108 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled. In the discussions regarding cursor movement and/or activation below, it is to be assumed that the input cursor directing device or push button may comprise any of those described above and specifically is not limited to the mouse cursor device.

In some implementations of the present invention additional processors or other components may be included. In addition, certain implementations of the present invention may not require nor include all of the above components. For example, hard copy device 111, display device 107, or mass storage device 106 may not be coupled with bus 100. Furthermore, it will be appreciated that although the block diagram of FIG. 1 is discussed above as a computer system, the diagram represents any of a wide variety of computers and computing devices.

Figure 2:
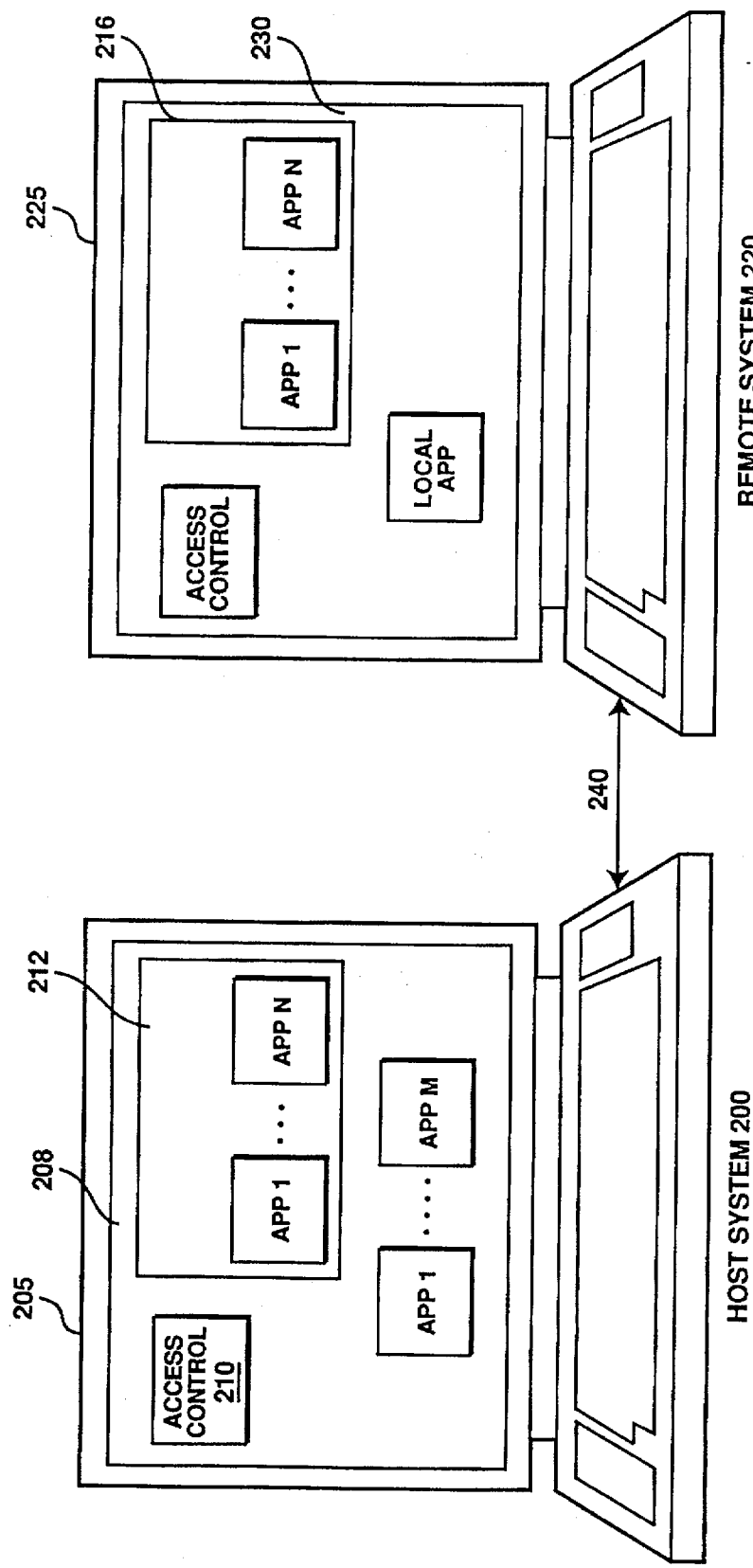
FIG. 2 shows an exemplary multi-computer system of the present invention.

FIG. 2 shows an exemplary multi-computer system of the present invention. Two computer systems are shown, host system 200 and remote system 220. In one embodiment of the present invention, each system 200 and 220 is a computer system as shown in FIG. 1. Systems 200 and 220 shown in FIG. 2 may be identical systems, or each system may be a different system. For example, certain components may be included in system 200 which are not included in system 220. Furthermore, each system may utilize different specific components. For example, both systems may include a display device, however the display device of each system may be manufactured by a different company.

In the system shown in FIG. 2, a connection line 240 couples host system 200 and remote system 220 together. Signals are transferred between system 200 and 220 via connection line 240. In one embodiment of the present invention, both host system 200 and remote system 220 include conventional modems and connection line 240 comprises a conventional telephone wire. It will be appreciated, however, that any of a wide variety of communication media may be employed by the present invention. Connection line 240 represents any of a wide variety of well-known communication media, while systems 200 and 220 include the necessary components to transfer signals via the particular communication medium being used.

Host system 200 is shown having a visual display device 205, and remote system 220 is shown having a visual display device 225. Visual display devices 205 and 225 can be any of a wide variety of conventional display devices.

Both host system 200 and remote system 220 share control of host system 200. However, the host and remote users only share control of one or more applications which the host user has selected to share. These shared applications are displayed within personal conferencing application display 212 on host system 200, and within the corresponding shared display 216 on remote system 220. A system for sharing applications is discussed in more detail in "Apparatus and Method for Application Sharing in a Graphic User Interface," Ser. No. 08/261,740, by Dale W. Boss and David G. Hicks.

The shared application(s) run on host system 200. What appears on display device 225 of remote system 220 is a duplicate image of what is displayed on display device 205 of host system 200. This image is transferred to remote system 220 from host system 200. All mouse and keyboard movements on the shared application(s) entered by the user of remote system 220 are executed on host system 200, subject to the access level accorded to remote system 220, as discussed below.

Figure 3:
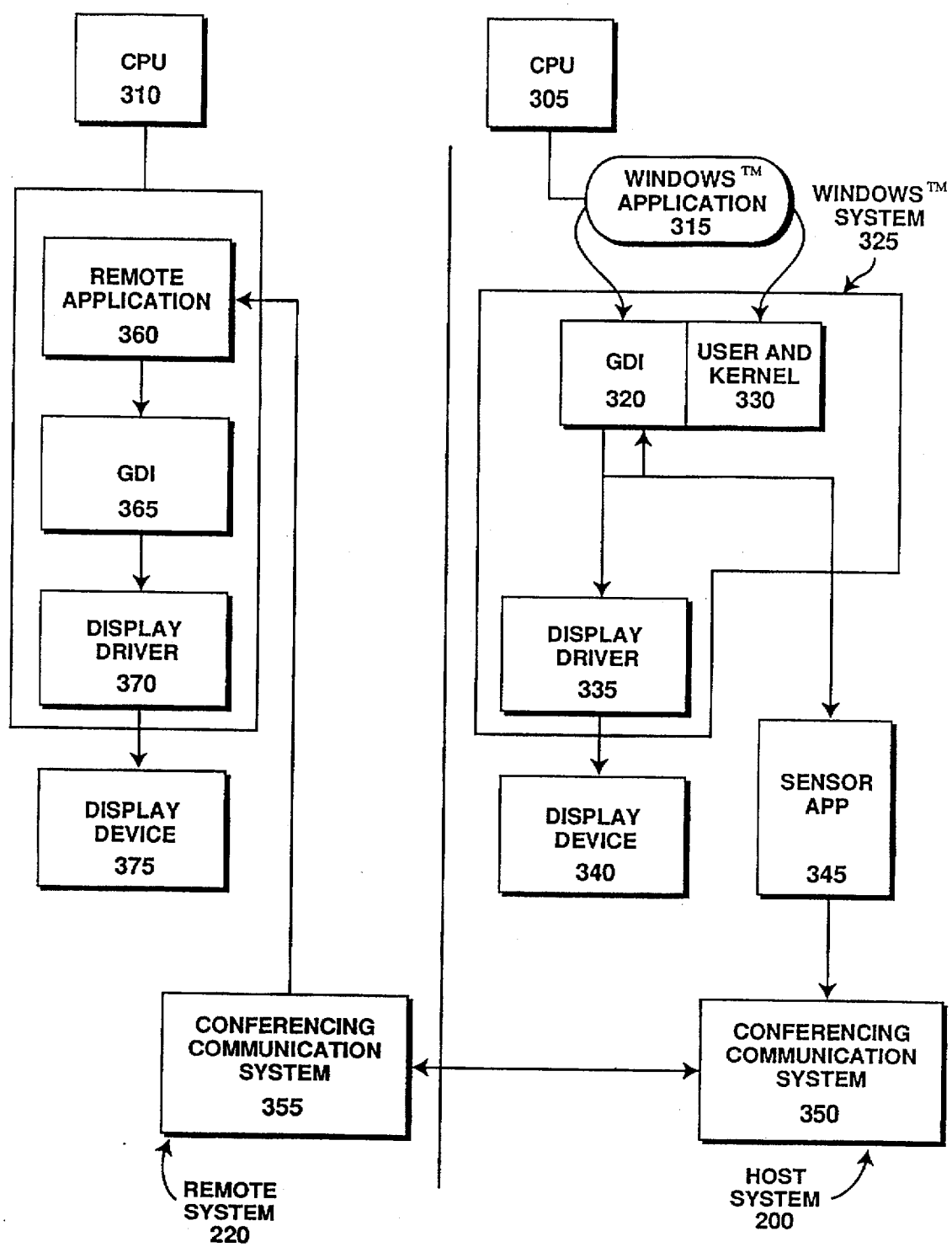
FIG. 3 is a block diagram illustrating the flow of information from a host system to a remote system in one embodiment of the present invention.

FIG. 3 is a block diagram illustrating the flow of information from a host system to a remote system, such as from host system 200 to remote system 220 of FIG. 2. CPU 305 drives applications on host system 200, while CPU 310 drives applications on remote system 220. In host system 200, a normal Windows™ application 315 such as Word™ is interfaced with graphical device interface (GDI) 320, which is software providing capabilities including drawing capabilities to Windows™ system 325. Windows™ application 315 is also interfaced with user 330. It should be noted that user 330 referred to here does not refer to the human user of a system, but is a Windows™ term for a part of the software of Windows™ system 325.

When Windows™ application 315 calls GDI 320 to perform a drawing, GDI 320 calls display driver 335. Display driver 335 actually performs the prompted drawings on display device 340 of host system 200.

Sensor application 345 detects when GDI 320 makes a call to display driver 335. At every point where GDI 320 makes a call to display driver 335, sensor application 345 inserts a jump instruction from display driver 335 to sensor application 345. All the information necessary for a given display driver to perform prompted line drawings and/or text drawings is retrieved and saved by sensor application 345 for use in the application sharing process between host system 200 and remote system 220.

Upon retrieving and saving the necessary information to enable a given display driver to perform the prompted drawings on a display device, sensor application 345 calls display driver 335. Display driver 335 then actually performs the prompted line drawings and/or text drawings on display device 340 of host system 200. Sensor application 345 then formats a communication packet based upon the display information retrieved from GDI 320 regarding the prompted drawings and transmits the communication packet over conferencing communication system 350 which transmits the communication packet to conferencing communication system 355 of remote system 220.

The communications packet is received by remote application 360 of remote system 220, which calls GDI 365. GDI 365 in turn calls display driver 370. Display driver 370 performs drawings on display device 375 of remote system 220 as indicated in the communication package transmitted by sensor application 345 of host system 200.

In one embodiment of the present invention, host system 200 sends a communications packet which includes a listing of shared applications. Remote application 360 stores this list and uses it to determine whether inputs from the remote system user are for shared applications or local (that is, non-shared) applications. Host system 200 sends a communications packet updating this list whenever a new application is to be shared or a shared application is to be no longer shared. In an alternate embodiment, remote application 360 maintains a list of display locations which belong to shared applications. This list is generated from the display information contained in the communications packets received from host system 200. In one implementation, this list of display locations is a list of rectangles which describe the on-display windows of the shared applications. Alternatively, this list of display locations may be a listing of individual display pixels.

Returning to FIG. 2, host system 200 includes a visual display device 205 which provides visual display 208. Visual display 208 is the visual representation of information displayed by host system 200 for the host system user to observe. As shown in FIG. 2, visual display 208 includes N applications displayed within personal conferencing application display 212, and M applications which are outside of personal conferencing application display 212. In one embodiment, the applications displayed within personal conferencing application display 212 are shared applications, and those applications which are outside of personal conferencing application display 212 are not shared applications. The display of the shared applications is duplicated as shared display 216 on remote system 220. Thus, any modification on host system 200 which modifies the area within personal conferencing application display 212 is transmitted to remote system 220. In addition, remote system 220 may also be executing multiple local applications which are displayed on visual display 230 outside of shared display 216.

Each application shown on visual display device 205 can be any of a wide variety of conventional programs. These applications can include graphics programs, spreadsheet programs, database programs, word processing programs, etc. In one embodiment, each application comprises its own window on visual display device 205, as shown.

Access control 210 is also displayed on visual display device 205. Access control 210 provides the user of host system 200 with the ability to change the access level provided to remote system 220, as discussed in more detail below.

In one embodiment of the present invention, an icon is included in the title bar of each application on host system 200 which is being shared with remote system 220. This icon indicates to the user of host system 200 that the application is being shared, and also indicates whether it is being shared in "locked" or "unlocked" access. Locked access means that the current display of the shared application is being sent to remote system 220, but attempted modifications to this application made by remote system 220 will not affect the application running on host system 200. Unlocked access means that the current display of the shared application is being sent to remote system 220, and changes made to this application by remote system 220 are being received and acted upon by host system 200. In one implementation, this icon is in the left-hand side of the title bar and is a single arrow if the application is in locked state and is a double arrow if the application is in unlocked state. In one implementation of the present invention, this icon is also displayed in the title bar of the shared application on remote system 220.

In one embodiment of the present invention, the remote system user's cursor is displayed as a cursor surrounded by a circle with a line through it whenever the cursor is within shared display 216 and the access level is locked. In addition, any attempts to enter input to a shared application, such as depressing and releasing a mouse button while the cursor is within shared display 216 or input on an alphanumeric input device, are discarded by remote system 220. In one implementation, remote system 220 provides feedback to the remote system user indicating the input was not accepted by, for example, issuing a beep or similar sound.

In one embodiment of the present invention, access control 210 is a symbolic representation of a cursor surrounded by a circle with a line drawn through it. The access level accorded to the remote system can be altered by the user of host system 200 by depressing and releasing a mouse button while a visible symbol (e.g., a pointer or cursor) is within the area of visual display device 205 occupied by access control 210. In this implementation, depressing and releasing a mouse button while the visible symbol is within access control 210 causes the access level to toggle between locked and unlocked.

In one embodiment of the present invention, an access control block is displayed on both host system 200 and remote system 220. In one implementation, the access control block is displayed outside of personal conferencing application display 212 on host system 200 and outside of shared display 216 on remote system 220. In one embodiment of the present invention, the access control block on the remote system is not affected by inputs from the remote system user. For example, if the remote system user depresses and releases a mouse button while a visible symbol is within the access control block of remote system 220, remote system 220 discards the remote user's input. In one implementation, remote system 220 discards the remote user's input without providing feedback to the remote system user. Alternatively, remote system 220 may provide feedback to the remote system user, such as by issuing a beep or similar sound.

It should be noted that although the access control on remote system 220 is not affected by inputs from the remote system user, the remote system may become the host system at a later time. For example, the current host system may terminate its sharing of applications, and the current remote system may start a sharing session. Thus, the current host system becomes the remote system and the current remote system becomes the host system.

In one embodiment of the present invention, host system 200 provides a single access control 210 which applies to all applications within personal conferencing application display 212. Thus, the access level for all shared applications is the same, and the access level for all applications can be updated by simply modifying a single access control. In this embodiment, whether shared applications are in locked or unlocked state is indicated to the user of remote system 200 through a title bar on shared display 216. In one implementation, this title bar includes wording indicating the identity of the host system and the access level of the remote system. The identity of the host system may be, for example, the name of the user of the host system, the name of the company which owns the host system, a unique system identification label, etc. Locked access is indicated, for example, using the phrase "Only Host Edits". Unlocked access is indicated, for example, using the phrase "Host and Guest Edit".

In an alternate embodiment of the present invention, a separate access control 210 exists for each shared application. In this embodiment, host system 200 provides different levels of access to remote system 220 for each shared application. In this embodiment, the identity of the host system and the access level of a particular shared application is displayed in the title bar of that particular application, rather than the title bar of shared display 216. In one implementation, different access levels are provided for different applications by remote system 220. Remote system 220 provides an additional level of filtering (such as in remote application 360 of FIG. 3) which checks the access level of the application the remote system user is attempting to modify. If the access level is unlocked, then the modification is transmitted to host system 200. However, if the access level is locked, then the modification is not transmitted to host system 200, and thus the modification is not made to the application.

Alternatively, different access levels for each shared application could be implemented within host system 200. In this implementation, remote system 220 transmits inputs affecting any shared application to host system 200 so long as remote system 220 is given unlocked access to any one (or more) of the shared applications. Host system 200 then determines which application the modification is for and checks the access level for that application. Host system 200 makes this determination by, for example, receiving an identifier from remote system 220 indicating which application the modification is for. If the access level is unlocked, then the input is acted on by the host system. If the access level is locked, then the input is ignored and discarded.

The discussion above describes shared display 216 being identical to that of personal conferencing application display 212. It will be understood by those skilled in the art, however, that due to signal propagation delays in the connection between the two systems, the display of shared display 216 will lag behind the display of personal conferencing application display 212.

Applications can be added to or removed from personal conferencing application display 212. Thus, if the host system user no longer desires the remote system user to access a particular application, that application can be removed from personal conferencing application display 212. The application can be removed from personal conferencing application display 212 in any of a wide variety of manners. For example, the host system user may elect to terminate operation of the application. Alternatively, additional applications can be added as shared applications by the host system user. This may be accomplished, for example, by starting a child application from a parent shared application. For example, if the host system is operating Word™ as a shared application and Help is selected from the Word™ application, Help is a child of the parent Word™, and both are shared applications.

Alternatively, a command option may be provided to the host system user which allows the shared applications to be altered. This command could be in an option from a pull-down menu on the host system, or a command-line input option, if such inputs are accepted by the system. In one embodiment, the host system maintains a shared applications list, which is a list containing all of the shared applications. This list is displayed to the host system user on the visual display device, and the user may select certain applications to be removed from the list. Alternatively, the host system user may also be provided with a list of applications contained in the host system which are not currently shared, and the host system user is able to select one of those applications to add to the shared applications list.

It should be noted that the visual display dimensions of personal conferencing application display 212 and shared display 216 need not be identical. Inputs of screen locations in shared display 216 can be converted to the corresponding coordinates in personal conferencing application display 212 using well-known mathematical procedures. In one embodiment of the present invention, host system 200 makes this conversion because it knows the dimensions of shared display 216 (since host system 200 transfers the information indicating what remote system 220 displays as shared display 216 to remote system 220).

In an alternate embodiment of the present invention, the size of shared display 216 can be altered by the remote system user. In this embodiment, the size of shared display 216 is transferred to host system 200 (such as by remote application 360 of FIG. 3) to enable host system 200 to convert coordinates to the proper location in personal conferencing application display 212. Alternatively, remote system 220 converts the coordinates to correspond to the display size host system 200 believes shared display 216 to have.

It should be noted that although it appears to the users of remote system 220 that they are making modifications to applications on their own computer systems, the modifications are actually being made on host system 200. Signals representing these modifications are transferred by host system 200 to remote system 220, provided remote system 220 has unlocked access, where shared display 216 is updated to reflect the modifications.

In some implementations of the present invention additional components or computer systems may be included in the multi-computer system of FIG. 2. For example, each computer system may comprise multiple processors, or more than two computer systems may be coupled together by connection line 240.

Figure 4A:
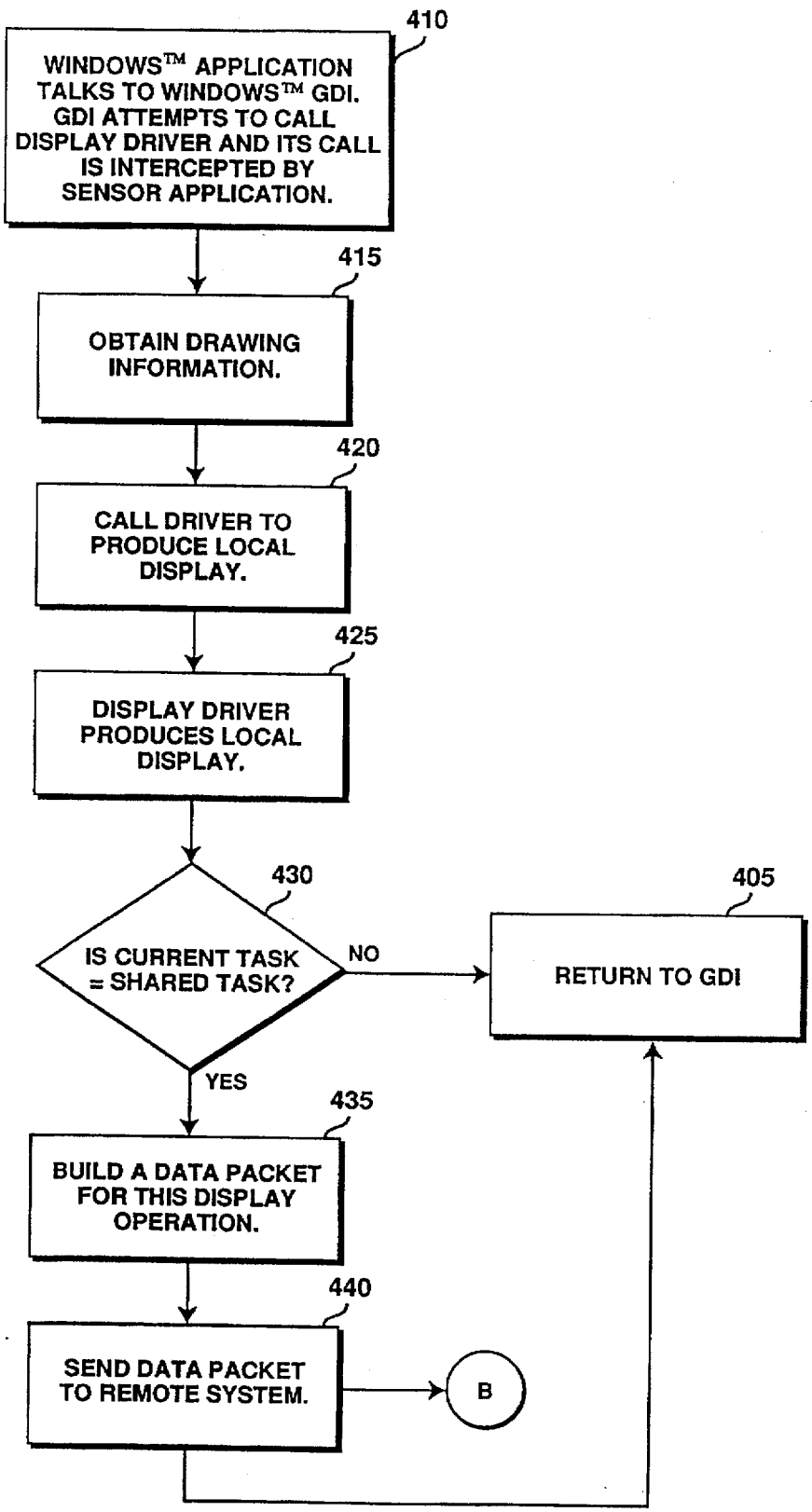
FIGS. 4a and 4b show the steps followed in transferring information from a host system to a remote system in one embodiment of the present invention.
Figure 4B:
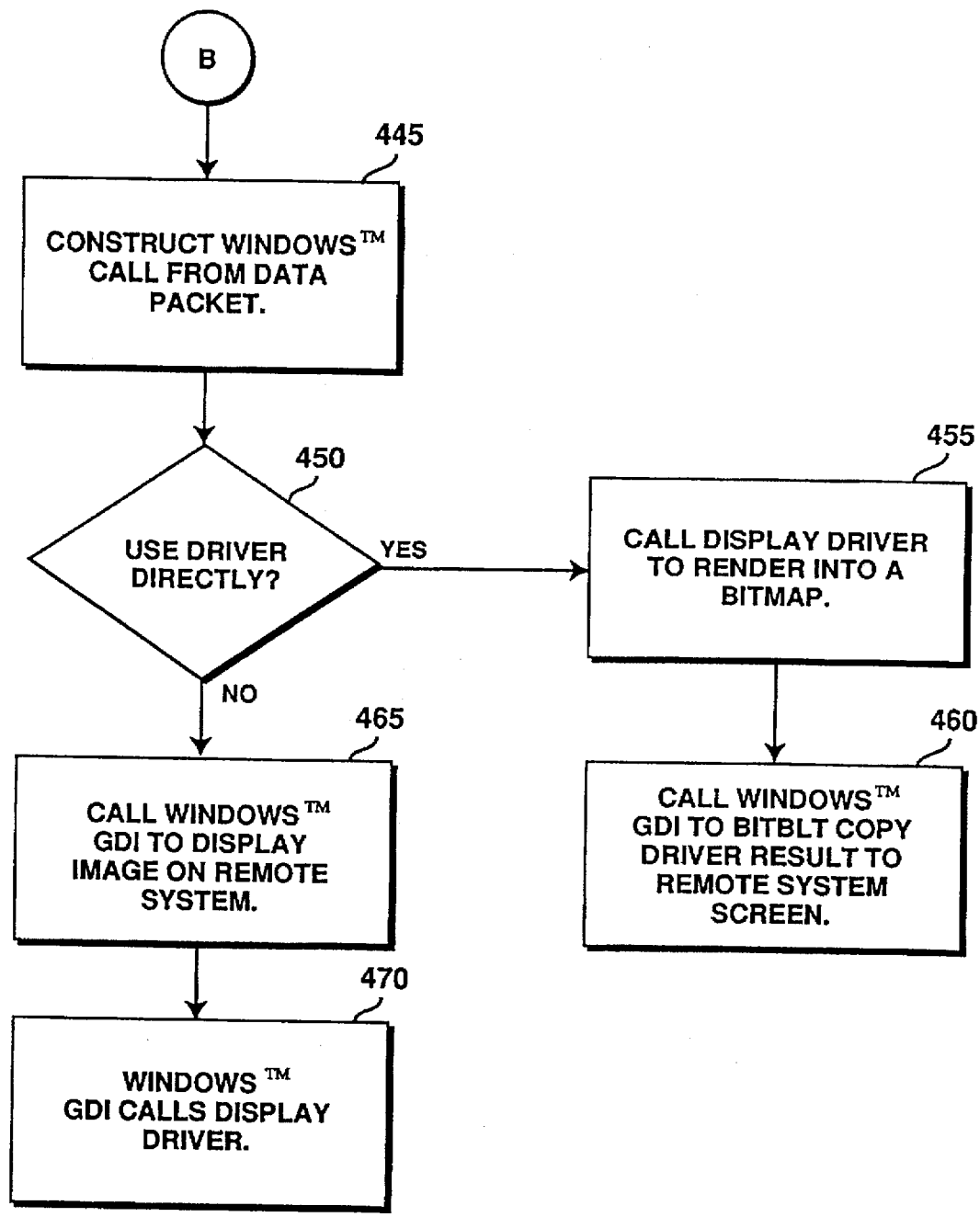

FIGS. 4a and 4b show the steps followed in transferring information from a host system to a remote system in one embodiment of the present invention. FIGS. 4a and 4b are described with reference to the components of FIG. 3. FIG. 4a illustrates the host side activity, while FIG. 4b illustrates the remote side activity.

In step 410 of FIG. 4a, Windows™ application 315 is interfaced with Windows™ GDI 320. At every point that Windows™ GDI 320 makes a call to display driver 335, sensor application 345 retrieves all of the information necessary for a display driver to perform the prompted drawings, step 415. GDI 320 calls display driver 335 whenever the visual display of application 315 needs to be updated, such as for cursor movements, new data input, etc.

Sensor application 345 then calls display driver 335, step 420. Display driver 335 produces the local display through display device 340, step 425. Sensor application 345 then determines whether the current task is part of a shared application, step 430. In one embodiment of the present invention, host system 200 maintains a list of applications which are shared with the remote system. Thus, by checking this list, sensor application 345 can quickly determine whether the current task is part of a shared application. If the current task being performed is not part of a shared application, then sensor application 345 continues monitoring GDI 320 for each call GDI 320 makes to display driver 335, step 405.

However, if the current task being performed is part of a shared application, then sensor application 345 builds a communication packet for the particular display operation being performed by host system 200, step 435. This communication packed is transmitted to remote system 220 and is accepted by remote application 360 of remote system 220, step 440.

FIG. 4b illustrates the remote side activity when information is transferred from a host system to a remote system. Remote application 360 constructs a Windows™ call from the communication packet transmitted by host system 200, step 445. The Windows™ call is used to display the shared task activity being performed on host system 200.

Remote application 360 then determines whether the display task can be performed directly by GDI 365, step 450. If the display task cannot be performed directly by GDI 365, then remote application 360 calls display driver 370 to render the Windows™ call into a bit map, step 455. Then, remote application 360 calls GDI 365 to bit block transfer (bitblt) the display driver result to display device 375, step 460.

Returning to step 450, if GDI 365 of remote system 220 is capable of performing the operation prompted and indicated in the communication packet sent by host system 200, GDI 365 calls display driver 370, step 465. Display driver 370 then performs the operation indicated in the Windows™ call constructed in step 445, step 470. The Windows™ operation executed on host system 200 is thus displayed on remote system 220.

Figure 5:
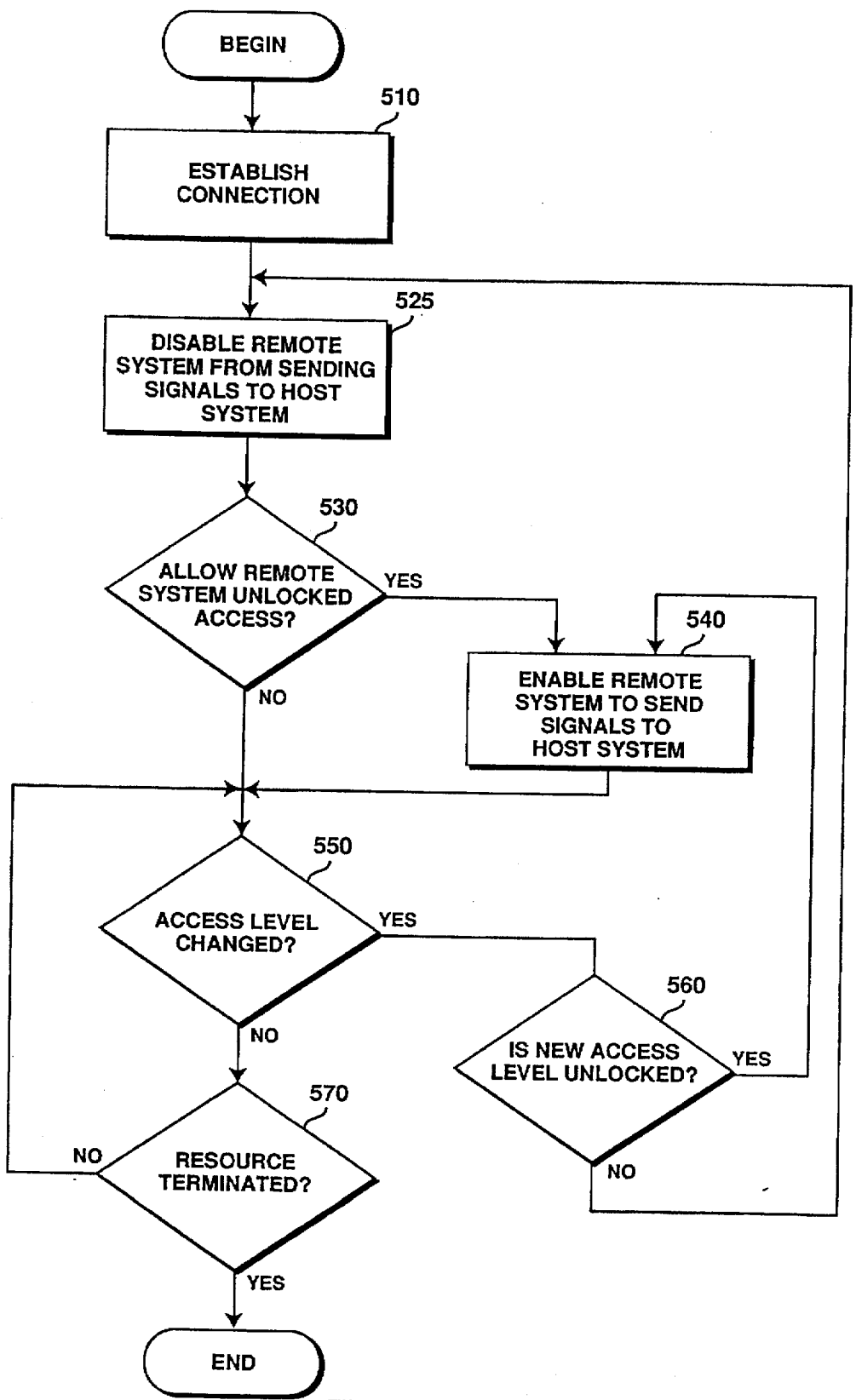
FIG. 5 shows the steps followed in one embodiment of the present invention in controlling a remote system's access to host system applications.

FIG. 5 shows the steps followed in one embodiment of the present invention in controlling a remote system's access to host system applications. The connection between the host system and the remote system is first established, step 510. In one embodiment of the present invention, the connection between the two systems is initiated by activating a personal conferencing application in the host system which controls the connection. The activation of this application causes control logic in a modem within the host system to establish a connection with a modem in the remote system. The information which will be transferred between the two systems, once the connection is established, will be determined by the personal conferencing application, then transferred via the two modems. In one implementation, this personal conferencing application is PROSHARE™, produced by Intel® Corporation of Santa Clara, Calif., the corporate assignee of the present invention.

In one embodiment of the present invention, the applications to be shared with the remote system are indicated when the personal conferencing application is activated. These applications may be indicated, for example, by host user-selection or a predetermined list in the host system (such as one stored in data storage device 106 or ROM 105 of FIG. 1).

After the connection is established, the remote system is disabled from sending signals to the host system, step 525. In one embodiment of the present invention, this is accomplished by the sensor application in the host system sending a signal to the remote system indicating to disable itself from sending signals to the host system. In response to this signal, the remote system filters out mouse and keyboard inputs by the user of the remote system which would modify any of the shared applications. In one implementation, remote application 360 of FIG. 3 performs this filtering. Thus, the remote system is enabled to receive changes in the current display of the shared applications from the host system, however the remote system is unable to send signals to the host system which would modify these shared applications.

The sensor application in the host system then checks whether the remote system is to be allowed unlocked access, step 530. In one embodiment of the present invention, whether the remote system is to be accorded unlocked access is stored as a flag in a register of the host system. The flag being in a first state indicates unlocked access, whereas the flag being in a second state indicates locked access. The host system may include multiple flags. In one implementation, each flag corresponds to an individual shared application, thereby allowing multiple applications to have different access levels. In an alternate implementation, each flag corresponds to a separate remote computer system, thereby allowing the sensor application to quickly determine the access level accorded to a particular remote system.

If the remote system is accorded unlocked access, then the sensor application in the host system sends a signal to the remote system indicating that inputs by the remote user which modify a shared application should be transmitted to the host system, step 540. This signal causes the remote system to transfer all mouse and keyboard inputs by the remote system user which affect a shared application to the host system. In one embodiment, this determination of which inputs are transferred to the host system is performed by remote application 360 of FIG. 3.

The sensor application in the host system continuously monitors whether the access level has been changed, step 550. Any of a wide variety of methods may be utilized in changing the access level. For example, in one embodiment of the present invention the access level accorded to the remote system may be changed by the host system user at any time. In an alternate embodiment, certain predetermined conditions are established, the occurrence of which causes the access level to change. For example, a level of filtering may be implemented to intercept signals which could be harmful to the operation of the host system. Certain screen locations or commands may be recognized in this embodiment which cause the access level to change, such as mouse events within certain screen areas, or commands which would terminate operation of the personal conferencing system. If one of these locations or commands is received by the host system, the host system responds by changing the access level rather than acting on the input.

If the access level is changed, then the sensor application of the host system determines whether the new access level is unlocked, step 560. If the new access level is unlocked, then the sensor application sends a signal to the remote system indicating it should transmit modifications made by the remote system user to shared applications to the host system, step 540. However, if the new access level is not unlocked, then the new access level is locked. Thus, the sensor application sends a signal to the remote system indicating it should not transmit modifications made by the remote system user to the host system, step 525. Thus, the host system user can continually change the access level without any negotiating with the remote system user.

If the access level is not changed, then the sensor application checks whether the personal conferencing application of the host system has been terminated, step 570. This conferencing application can be terminated at any time by the host system user. In one embodiment of the present invention, the conferencing application can also be terminated at any time by the remote system user, provided the remote system is accorded unlocked access to the shared applications. Alternatively, certain predetermined conditions can be established in the host system, the occurrence of which causes termination of the conferencing application. For example, certain commands which are predetermined to be detrimental to the operation of the host system, such as deletion of a particular file or data set, can be intercepted by the host system as they are received from the remote system and cause the conferencing application to terminate. In one implementation, the conferencing application terminates by the sensor application no longer transmitting information to the remote system, and the host system discarding any inputs received from the remote system.

If the conferencing application is not terminated, then the host system repeats steps 550 and 570 until either the access level is changed or the conferencing application is terminated.

An application on the remote system filters mouse and keyboard events received by the remote user making inputs to the shared display on the remote system. In one embodiment, this is done by remote application 360 of FIG. 3. When the remote system has locked access, mouse actions (e.g., "clicking") and keyboard events in the remotely shared display on the remote system which are performed on a shared application are not transmitted to the host system. Instead, the remote system signals the remote user that an erroneous input was made. However, when the remote system has unlocked access, mouse actions and keyboard events are transmitted to the host system.

Figure 6:
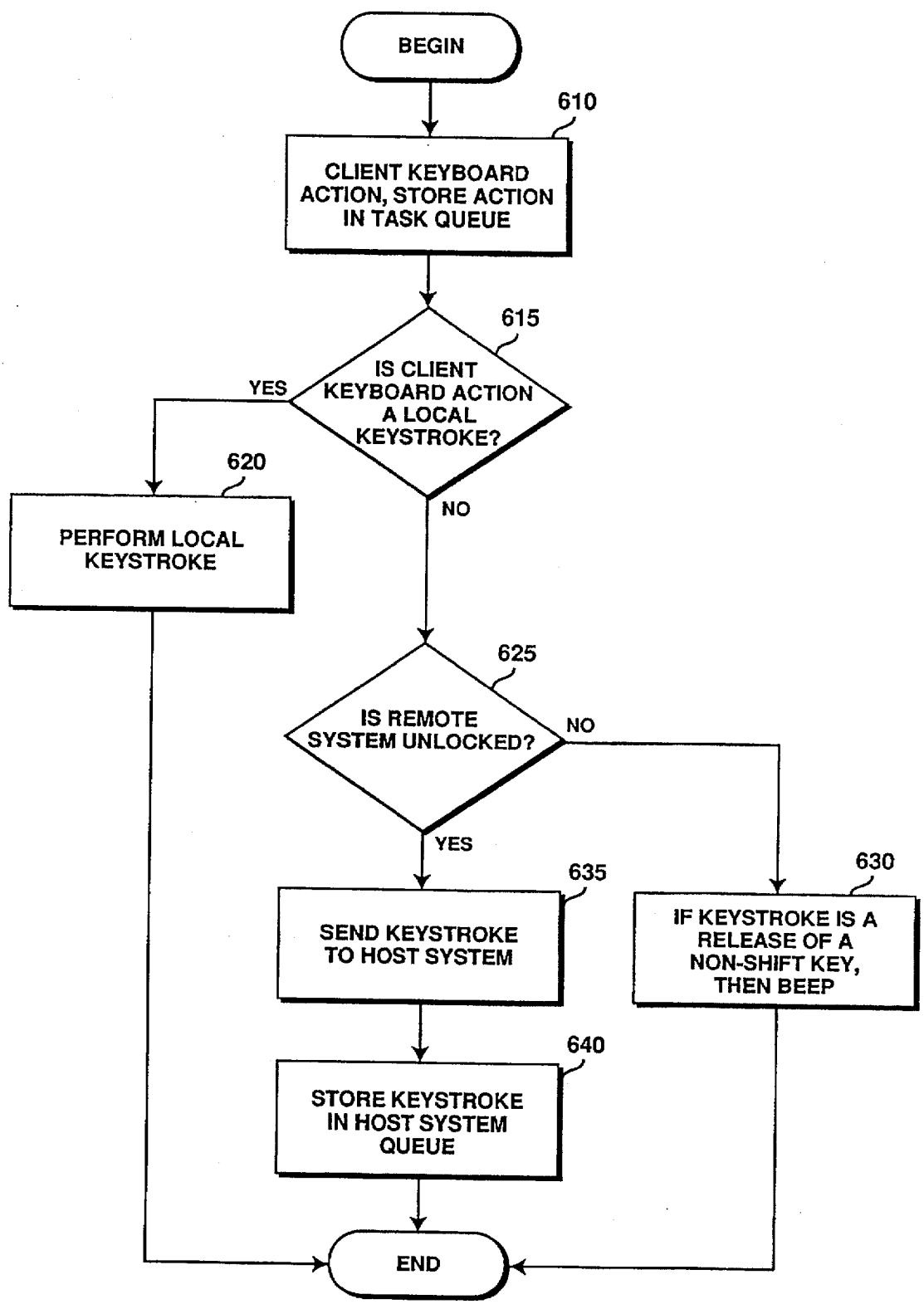
FIG. 6 is a flow chart showing the steps followed by a remote system in response to keyboard events from the remote system in one embodiment of the present invention.
Figure 7A:
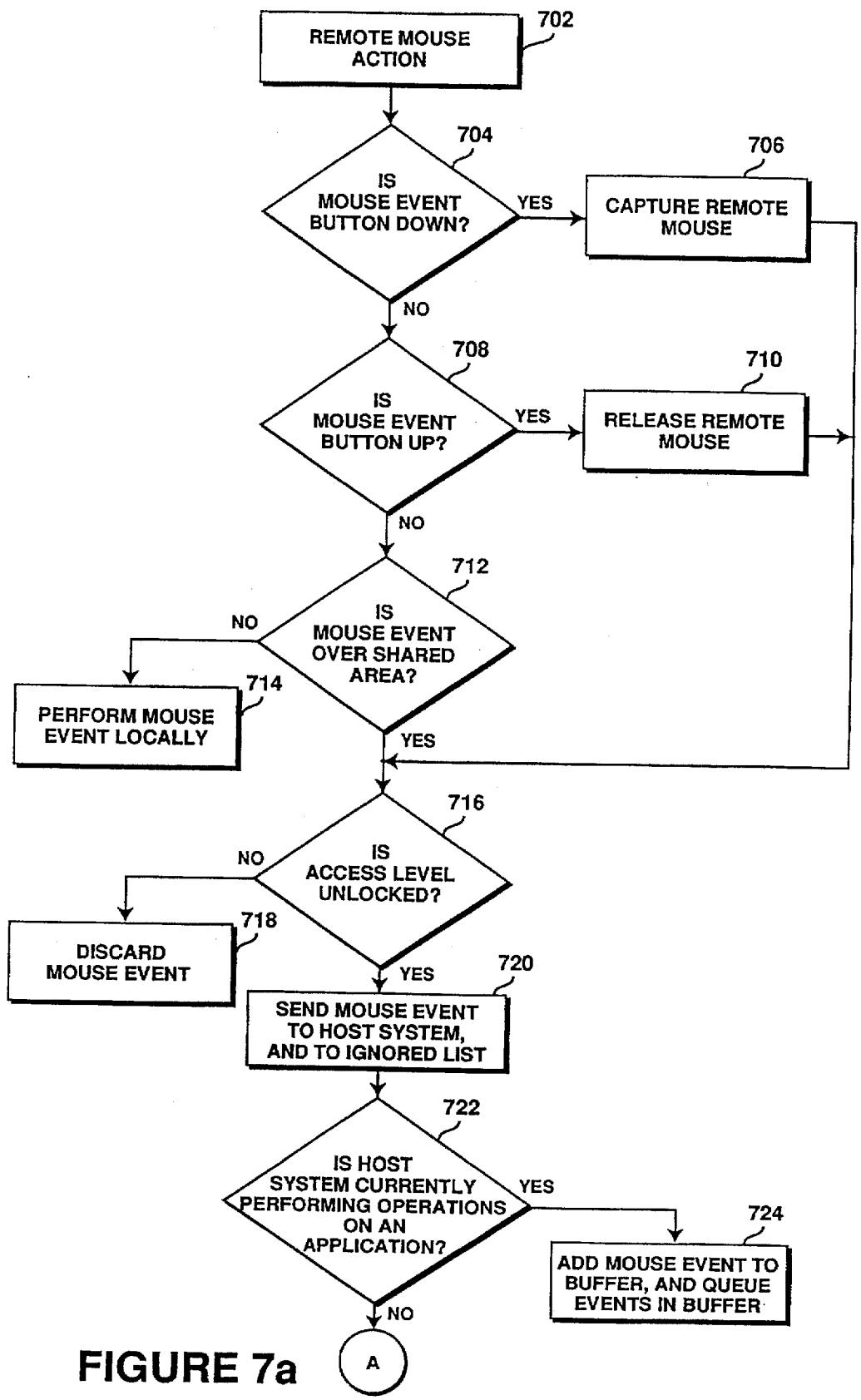
FIGS. 7a–7d are a flow chart showing the steps followed by a remote system in response to mouse events from the remote system in one embodiment of the present invention.
Figure 7B:
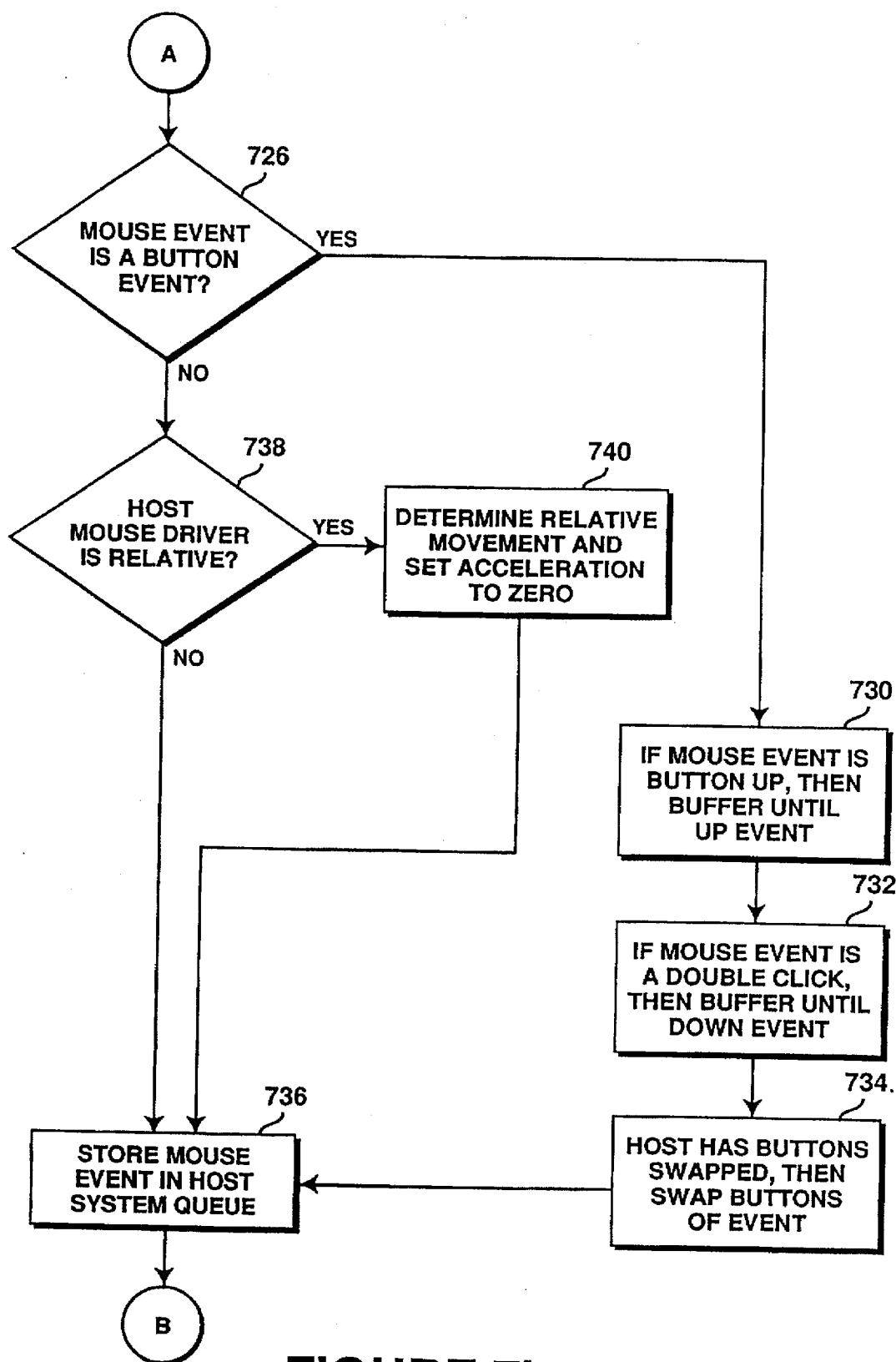
Figure 7C:
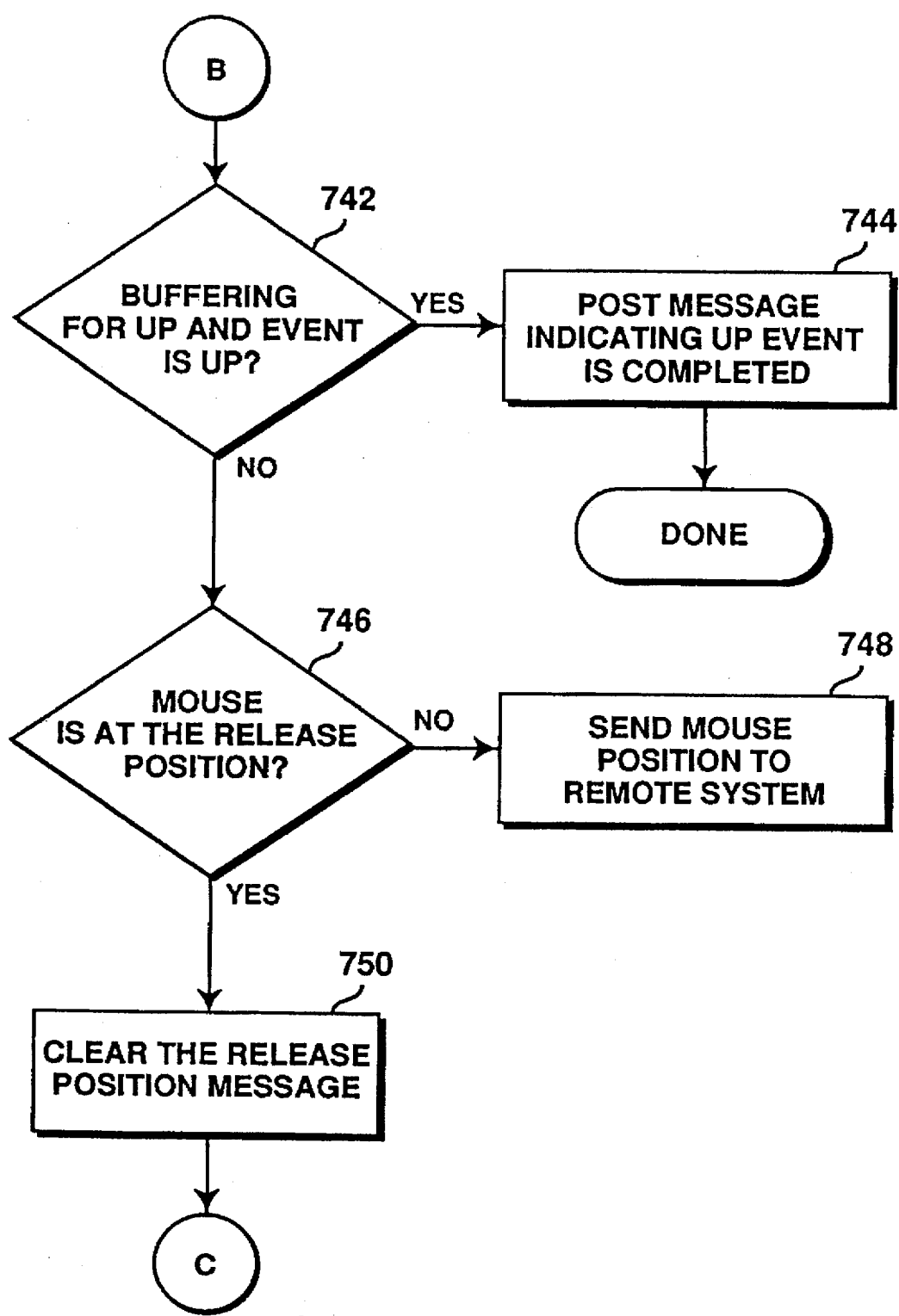
Figure 7D:
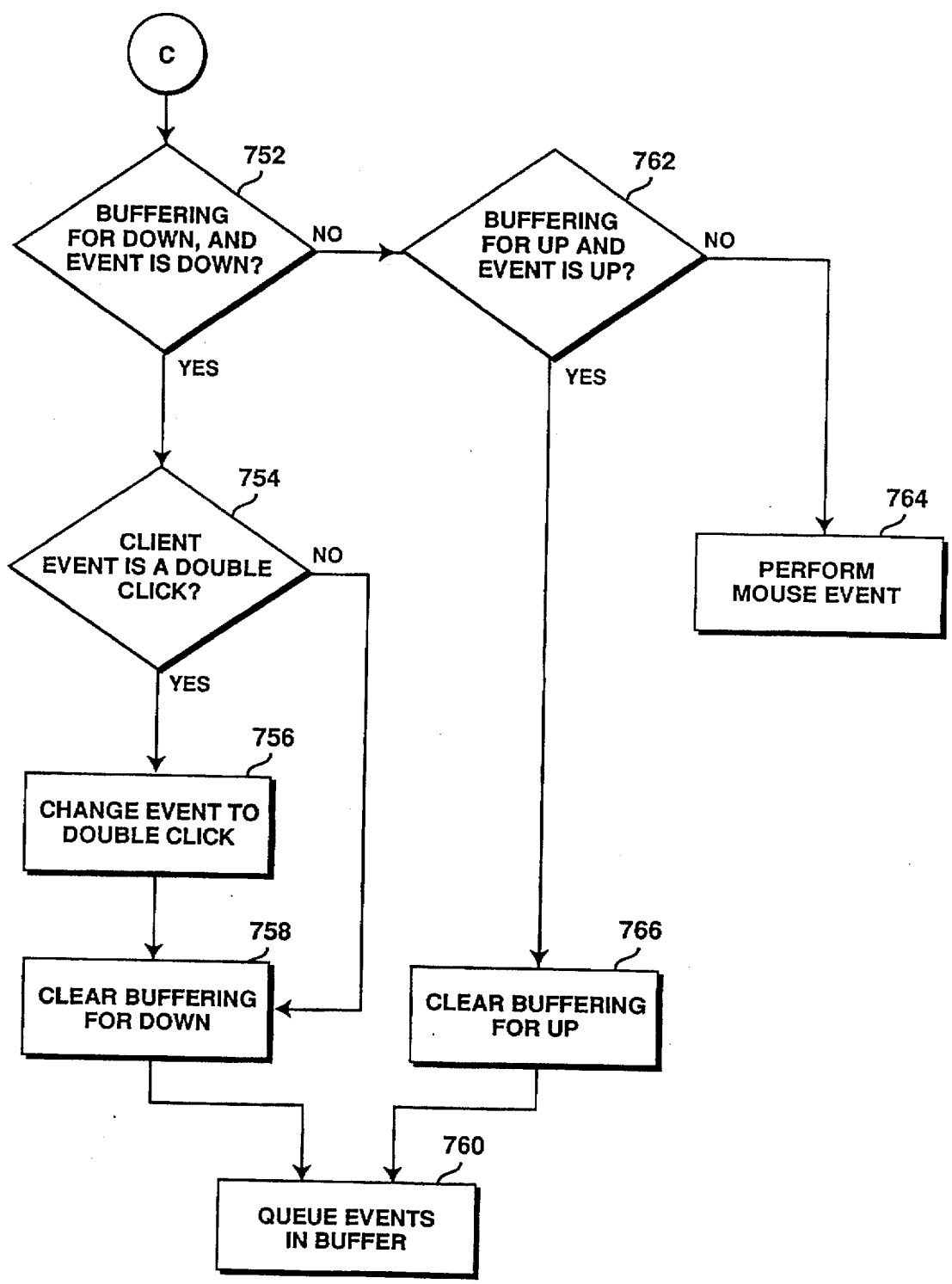

FIG. 6 is a flow chart showing the steps followed by the remote system in response to keyboard events from the remote system in one embodiment of the present invention. Remote keyboard events (that is, keyboard actions input by the remote system user) are first stored in the remote system task queue, step 610. An application on the remote system (such as remote application 360 of FIG. 3) then checks whether the keystroke is a local keystroke (that is, the keystroke is not within a shared application), step 615. The application checks whether the keystroke is a local keystroke by determining whether the currently active window belongs to a shared application from the host system. If the keystroke is a local keystroke, then the remote system performs the keyboard actions locally, without transferring them to the host system, step 620.

If, however, the keystroke is not a local keystroke, then an application on the remote system (such as remote application 360 of FIG. 3) checks whether the remote system is unlocked, step 625. If the remote system is not unlocked, then if a keystroke is a release of a non-shift key, the remote system sounds an error beep, step 630. The remote system does not transfer the keystroke to the host system. However, if the remote system is unlocked, then the keystroke is transmitted to the host system, step 635.

The keystroke is received by the host system and stored in the host system queue, step 640. When the keystroke reaches the front of the queue, the host system CPU modifies the shared application in accordance with the keystroke, thereby updating both the host display of the shared application and the remote display of the shared application, as discussed above.

FIGS. 7a–7d are a flow chart showing the steps followed by the remote system in response to mouse events from the remote system in one embodiment of the present invention. A mouse action is first performed by the remote user on the remote system, step 702. This action could be, for example, depressing a mouse button, releasing a mouse button, or moving the mouse. If the mouse action is a mouse button down event, step 704, then the remote mouse is "captured," step 706. If the mouse action is a button up event, step 708, then the remote mouse is released, step 710.

An application in the remote system (such as remote application 360 of FIG. 3) then checks whether the mouse event occurred over a shared area, step 712. The application performs this check by determining whether the mouse even occurred over an area of a shared application received from the host system (such as shared display 216 of FIG. 2). If the mouse event did not occur over a shared area, then the mouse event is performed locally on the remote system, step 714. However, if the mouse event did occur over a shared area, then the application checks whether the access level of the remote system is unlocked, step 716. If the access level is not unlocked, then the mouse event is discarded, step 718. That is, the mouse event is ignored by the remote system; the mouse event is not performed in either the remote system or the host system.

If the remote system has unlocked access to the host system, then the mouse event is transmitted to the host system, step 720. The mouse event is also stored in the ignored list in the remote system. If the host system is currently performing operations on applications, step 722, then the transmitted remote mouse event is added to the buffer, and is queued in the buffer, step 724.

If the remote mouse being transmitted is not buffered, then if the mouse event is a button event, step 726, the mouse event is buffered in the host system. If the mouse event transmitted by the remote system is a button up event, then the mouse event is buffered in the host system until a button up event is performed, step 730. If the mouse event is a double click, then the mouse event is buffered until a mouse down event is performed, step 732. If the host user has a mouse button swapped, then the buttons of the mouse are swapped, step 734. The mouse events are then stored in the host system queue, step 736.

Returning to step 726, if the mouse event is not a button event, then an application in the remote system (such as remote application 360 of FIG. 3) checks whether the host mouse driver is relative, step 738. If the host mouse driver is not relative, then the mouse event is stored in the host system queue, step 736. However, if the host mouse driver is relative, then the relative movement of the host mouse driver is determined and the acceleration is set to zero, step 740.

If a mouse action for a button up event is buffered and if a mouse up event is performed, step 742, then a mouse message indicating that an up event is completed is transmitted to the system queue, step 744. If the current mouse position is at the release position, step 746, then the release position to be performed is completed, step 750. However, if the current mouse position is not at the release position, then the host mouse position is transmitted to the remote system, step 748.

If a mouse button down event is buffered and the current mouse event is down, step 752, and if the remote event is also a double click, step 754, then the event is changed to a double click mouse event, step 756. The mouse down event is cleared from the buffer, step 758, and the mouse events are queued in the buffer, step 760. If the remote event is not a double click mouse event, step 754, then the event is cleared from the buffer, step 758. If a mouse up event is buffered and the current mouse event is up, step 762, then the mouse up event is cleared from the buffer, step 766. Otherwise, the mouse event is performed, step 764.

It should be noted that typically only mouse movements by the remote system user within the shared application are acted upon by the host system. That is, mouse movements outside of the shared applications are not transmitted to the host system. Alternatively, however, certain mouse movements outside of the shared applications could also be transmitted to, and acted upon, by the host system. These mouse movements may include, for example, the situation where a mouse button is pushed down to pull down a menu within a shared application and the mouse is subsequently dragged outside of the shared application before the button is released.

Therefore, by having a single access control which is displayed on the display device of the host system, the user of the host system is able to quickly and easily alter the access level of shared applications accorded to the remote system. Thus, if the user of the remote system attempts to modify applications which the user of the host system desires to leave unmodified, the access level for the remote user can be quickly changed by the host user before substantial modifications are made.

In addition, by allowing the remote system to be either locked or unlocked, the user of the host system is able to control which actions the remote system can take. When the remote system is locked, the user of the host system is able to simply show various images to the user of the remote system without fear of the images being modified. Alternatively, when the remote system is unlocked, the user of the host system is able to provide the user of the remote system with complete access to the shared applications, thereby allowing both users to work together on a particular image.

It will be appreciated that although the above descriptions discuss two computer systems transferring data between them, any number of computers can be used within the spirit and scope of the present invention. In one embodiment, three or more computer systems are coupled together in a conventional manner, such as by a LAN or telephone lines, with one system being designated the host system and the remaining systems designated as remote systems. As in the discussions above, the host system initiates the connection of the systems.

In a multiple-remote system situation, the host computer system transfers information indicating the current display of the shared applications to each of the other computer systems, analogous to the discussion above. In one implementation, a single access level is used for all remote systems. In an alternate implementation, each remote system is given a separate access level control. In this implementation, the host system sends signals to each of the remote systems, indicating whether that particular system has locked or unlocked access.

Thus, a host computer system of the present invention is able to share its applications and data with a remote system utilizing three separate levels of control. First, the remote user may have no access to the application; the remote user can neither view nor modify the application. This is accomplished by not including the application as a shared application of the host system. Second, the remote user may be able to view the application without the ability to make modifications to the application. This is accomplished by including the application as a shared application of the host computer with locked access. Third, the remote user may be able to both view the application and make modifications to the application. This is accomplished by including the application as a shared application of the host computer with unlocked access.

It will be appreciated that although the above descriptions discuss three levels of access control (that is, no access, locked access, and unlocked access), additional access levels are within the spirit and scope of the present invention. For example, in one embodiment of the present invention an additional access level is implemented which allows cursor activation but not data entry. In this embodiment, signals representing cursor movement or activation by the remote user utilizing the cursor control device are transferred from the remote system to the host system, however inputs from other input devices, such as the alphanumeric keypad, are not transferred to the host system. Thus, this level of access allows the remote user to scroll around the application utilizing the cursor control device while preventing the remote user from entering new data.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for dynamically controlling a remote system's access to shared applications on a host system has been described.

What is claimed is:

1. In a conferencing system including a host computer communicatively coupled to a remote computer, a method of controlling said remote computer's access to a plurality of applications, said plurality of applications being executed on said host computer and a visual display of said plurality of applications being transferred to said remote computer, said method comprising the steps of:

(a) said host computer setting an unlocked access level for said remote computer for select ones of the plurality of applications, wherein said unlocked access level indicates that information input at said remote computer is to be input to said select applications, and wherein said access level for each of the plurality of applications is alterable by said host computer while said host computer is executing said plurality of applications; and (b) said host computer changing said unlocked access level to a locked access level for said remote computer for select ones of the plurality of applications, wherein said locked access level indicates that said information input at said remote computer is not to be input to said select applications.

2. The method of claim 1, further comprising the step of:
   transmitting, an indication of said unlocked access level to said remote computer, wherein said unlocked access level enables said remote computer to transfer said information input at said remote computer to said host computer.

3. The method of claim 1, further comprising the step of:
   transmitting, responsive to said changing step (b), an indication of said locked access level to said remote computer, wherein said locked access level prevents said remote computer from transferring said information input at said remote computer to said host computer.

4. The method of claim 1, wherein said host computer is executing a conferencing application and a plurality of applications associated with said conferencing application, wherein said selected application is one of said plurality of applications.

5. The method of claim 4, wherein said unlocked access level and said locked access level are utilized for each application of said plurality of applications to indicate an ability of said remote computer to selectively access each application of said plurality of applications.

6. The method of claim 4, wherein a separate access level is associated with each application of said plurality of applications to indicate an ability of said remote computer to access each application of said plurality of applications.

7. The method of claim 1 wherein said step (b) of said host computer changing said unlocked access level to a locked access level comprises the steps of:
   said host computer detecting input from a computer-user requesting that said unlocked access level be changed to a locked access level; and
   said host computer changing said unlocked access level to a locked access level in response to the detected input.

8. The method of claim 1 wherein said step (b) of said host computer changing said unlocked access level to a locked access level comprises the steps of:
   said host computer detecting input from said remote computer predetermined to be detrimental to the operation of said host computer; and
   said host computer changing said unlocked access level to a locked access level in response to the detected input.

9. The method of claim 8 wherein said step of said host computer detecting input from said remote computer predetermined to be detrimental to the operation of said host computer comprises the step of detecting a command from said remote computer to delete a data set.

10. A computer conferencing system for a network of computers comprising:
    a remote computer;
    a host computer including a host connecting device and a host display device, wherein said host display device produces a current visual display for a selected application of a plurality of applications executing on said host computer, wherein said host connecting device provides a duplicate visual display to said remote computer, and wherein said host computer includes a processor for determining an unlocked access level for said remote computer corresponding to each of the plurality of applications executing on said host computer, wherein said unlocked access level indicates that inputs from said remote computer are to be input to said selected application of the plurality of applications, and wherein the processor may change said unlocked access level to a locked access level for each of the plurality of application, wherein said locked access level indicates that inputs from said remote computer are not to be input to said selected application of the plurality of applications, and wherein said access level is accessible to a user of said host system and is changeable at any time during operation of said host computer by said user of said host computer;

said remote computer including a remote connecting device and a remote display device, wherein said remote display device generates a visual display from said duplicate visual display; and a connecting line coupled to said host connecting device and said remote connecting device for exchanging information between said host computer and said remote computer.

11. The network of claim 10, wherein said host computer allows said remote computer to terminate execution of said selected application.

12. The network of claim 10, wherein said host connecting device comprises a first modem, said remote connecting device comprises a second modem, and said connecting line comprises a telephone line.

13. The network of claim 10, wherein said unlocked access level enables said remote computer to transfer signals modifying said selected application executing on said host computer.

14. The network of claim 10, wherein said locked access level prevents said remote computer from transferring signals modifying said selected application executing on said host computer.

15. A host computer comprising:

a processing unit;

a bus, coupled to said processing unit, configured to communicate data to said processing unit; and said processing unit being configured to provide said host computer with selective control over a remote computer's access to a plurality of applications being executed on said host computer, provide a current visual display of said applications to said remote computer, determine an unlocked access level a selected application of the plurality of applications for said remote computer, said unlocked access level indicating that input from said remote computer are to be input to said selected application, and change said unlocked access level to a locked access level for said remote computer, said locked access level indicates that inputs from said remote computer are not to be input to said selected application.

16. The host computer of claim 15, wherein said unlocked access level enables said remote computer to exchange information modifying said selected application with said host computer.

17. The host computer of claim 15, wherein said locked access level prevents said remote computer from exchanging information modifying said selected application with said host system.

18. A computer-readable medium having a plurality of sequences of instructions thereon, said plurality of sequences of instructions comprising a sequence of instructions which, when executed by a processor of a host computer, cause said processor to perform the steps of:

executing a plurality of applications;

transferring a visual display of said plurality of applications to a plurality of remote computers;

setting a first access level providing access to select ones of the plurality of applications for select ones of the plurality of remote computers, and providing a second access level to other remote computers; and changing said first access level to the second access level for select ones of the plurality of remote computers for select ones of the plurality of applications.

19. The computer-readable medium of claim 18 wherein said step of changing said first access level to a second access level comprises the steps of:

said host computer detecting input from said remote computer predetermined to be detrimental to the operation of said host computer; and said host computer changing said first access level to the second access level in response to said input.

20. The computer-readable medium of claim 18, wherein said plurality of sequences of instructions further comprises a sequence of instructions which, when executed by said processor, cause said processor to perform the step of communicating either said first access level or said second access level to said remote computer.

* * * * *